US009139235B2

(12) United States Patent
Craig et al.

(10) Patent No.: US 9,139,235 B2
(45) Date of Patent: Sep. 22, 2015

(54) VEHICLE FRAME RAIL AND PILLAR CONNECTION

(71) Applicant: Ford Global Technologies, LLC, Dearborn, MI (US)

(72) Inventors: Ryan Craig, Harrison Township, MI (US); Jason Scott Balzer, Commerce Township, MI (US); Kumar Mahadevan, Sterling Heights, MI (US); Zhenyan Gao, Northville, MI (US); Yuan Zhou, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 13/899,178

(22) Filed: May 21, 2013

(65) Prior Publication Data

US 2014/0346816 A1 Nov. 27, 2014

(51) Int. Cl.
*B62D 25/04* (2006.01)
*B62D 27/02* (2006.01)
*B62D 25/02* (2006.01)

(52) U.S. Cl.
CPC ............ *B62D 27/023* (2013.01); *B62D 25/025* (2013.01); *B62D 25/04* (2013.01)

(58) Field of Classification Search
CPC ........... B21D 26/033; B23K 2201/006; B62D 21/157; B62D 25/025; B62D 25/04
See application file for complete search history.

(56) References Cited

U.S. PATENT DOCUMENTS

| | | | |
|---|---|---|---|
| 1,717,029 A | 6/1929 | Heintz | |
| 1,797,917 A | 3/1931 | Ledwinka | |
| 2,389,907 A * | 11/1945 | Helmuth | 296/203.01 |
| 3,132,891 A | 5/1964 | Pyuro et al. | |
| 4,252,364 A * | 2/1981 | Toyama et al. | 296/203.01 |
| 4,615,558 A | 10/1986 | Nakamura et al. | |
| 4,911,495 A * | 3/1990 | Haga et al. | 296/209 |
| 5,372,400 A | 12/1994 | Enning et al. | |
| 5,382,071 A | 1/1995 | Enning et al. | |
| 5,458,393 A * | 10/1995 | Benedyk | 296/203.01 |
| 5,715,643 A | 2/1998 | Parkinson | |
| 5,873,618 A | 2/1999 | Ejima | |
| 6,003,898 A * | 12/1999 | Teply et al. | 280/785 |
| 6,022,070 A * | 2/2000 | Ashina et al. | 296/205 |
| 6,053,564 A | 4/2000 | Kamata et al. | |
| 6,059,899 A * | 5/2000 | Shibata et al. | 148/320 |
| 6,086,141 A | 7/2000 | Masuda et al. | |
| 6,092,865 A | 7/2000 | Jaekel et al. | |

(Continued)

FOREIGN PATENT DOCUMENTS

DE 102008024762 A1 * 12/2009 ............. B62D 25/20
DE 10314080 B4 * 4/2010 ............. B62D 25/04

(Continued)

*Primary Examiner* — Glenn Dayoan
*Assistant Examiner* — Paul Chenevert
(74) *Attorney, Agent, or Firm* — Raymond Coppiellie; Price Heneveld LLP

(57) ABSTRACT

A vehicle frame includes an outside rail section having an upper flange, a lower flange, and an inward facing cavity between the upper and lower flanges. An inside rail section is coupled along the upper and lower flanges of the outside rail section and has an outward facing cavity that aligns with the inward facing cavity to enclose an interior volume. A pair of hydroform tubes extending vertically through apertures at spaced longitudinal locations in the upper flange and engage a bottom surface of the inward cavity to define a pillar for supporting a vehicle roof.

20 Claims, 3 Drawing Sheets

(56) References Cited

U.S. PATENT DOCUMENTS

| | | |
|---|---|---|
| 6,123,378 A | 9/2000 | Teply et al. |
| 6,179,370 B1 | 1/2001 | Takeuchi |
| 6,217,109 B1 | 4/2001 | Okana et al. |
| 6,293,617 B1 | 9/2001 | Sukegawa |
| 6,302,478 B1 | 10/2001 | Jaekel et al. |
| 6,322,135 B1 | 11/2001 | Okana et al. |
| 6,409,257 B1 | 6/2002 | Takashina et al. |
| 6,412,857 B2 | 7/2002 | Jaekel et al. |
| 6,533,348 B1 | 3/2003 | Jaekel et al. |
| 6,595,579 B2 | 7/2003 | Freitag et al. |
| 6,709,047 B2 | 3/2004 | Burge |
| 6,824,204 B2 | 11/2004 | Gabbianelli et al. |
| 6,854,795 B2 | 2/2005 | Yamazaki et al. |
| 6,948,768 B2 | 9/2005 | Corcoran et al. |
| 7,293,823 B2 | 11/2007 | Chen et al. |
| 7,325,866 B2 | 2/2008 | Horton et al. |
| 7,357,448 B2 * | 4/2008 | Chen et al. ............... 296/203.03 |
| 7,422,272 B2 | 9/2008 | Horton et al. |
| 7,488,022 B2 * | 2/2009 | Belwafa et al. ................. 296/29 |
| 7,543,882 B2 | 6/2009 | Day et al. |
| 7,547,063 B2 | 6/2009 | Stojkovic et al. |
| 7,857,377 B2 | 12/2010 | Chen et al. |
| 8,007,032 B1 | 8/2011 | Craig |
| 8,246,108 B2 * | 8/2012 | Itakura ..................... 296/193.06 |
| 8,272,682 B2 | 9/2012 | Cimatti |
| 8,282,154 B2 | 10/2012 | Maruyama |
| 8,366,185 B2 | 2/2013 | Herntier |
| 2006/0152027 A1 * | 7/2006 | Stojkovic et al. ............... 296/29 |
| 2007/0063546 A1 | 3/2007 | Lassl et al. |
| 2007/0085382 A1 * | 4/2007 | Floth et al. ............... 296/203.01 |
| 2007/0295784 A1 * | 12/2007 | Chen et al. ................. 228/112.1 |
| 2008/0001437 A1 * | 1/2008 | Balzer et al. ............. 296/203.03 |
| 2010/0026053 A1 * | 2/2010 | Ratsos et al. .................. 296/205 |
| 2010/0194147 A1 | 8/2010 | Aul et al. |
| 2010/0237661 A1 * | 9/2010 | Baccouche et al. ........... 296/210 |
| 2012/0153675 A1 | 6/2012 | Rawlinson et al. |
| 2012/0261950 A1 | 10/2012 | Balzer et al. |
| 2012/0313400 A1 | 12/2012 | Balzer et al. |
| 2013/0049408 A1 | 2/2013 | Kurogi et al. |
| 2015/0123429 A1 * | 5/2015 | Watanabe et al. ...... B62D 25/04 |
| 2015/0183466 A1 * | 7/2015 | Jung et al. ............... B62D 21/15 |

FOREIGN PATENT DOCUMENTS

| | | | | |
|---|---|---|---|---|
| EP | 1498345 A2 * | 1/2005 | ............ | B62D 25/04 |
| JP | 62039374 | 2/1987 | | |
| JP | 04081371 | 3/1992 | | |
| JP | 2010155509 A * | 7/2010 | ............ | B62D 25/20 |
| WO | WO 2014083704 A1 * | 6/2014 | ............ | B62D 25/20 |
| WO | WO 2015049949 A1 * | 4/2015 | ............ | B62D 25/04 |

* cited by examiner

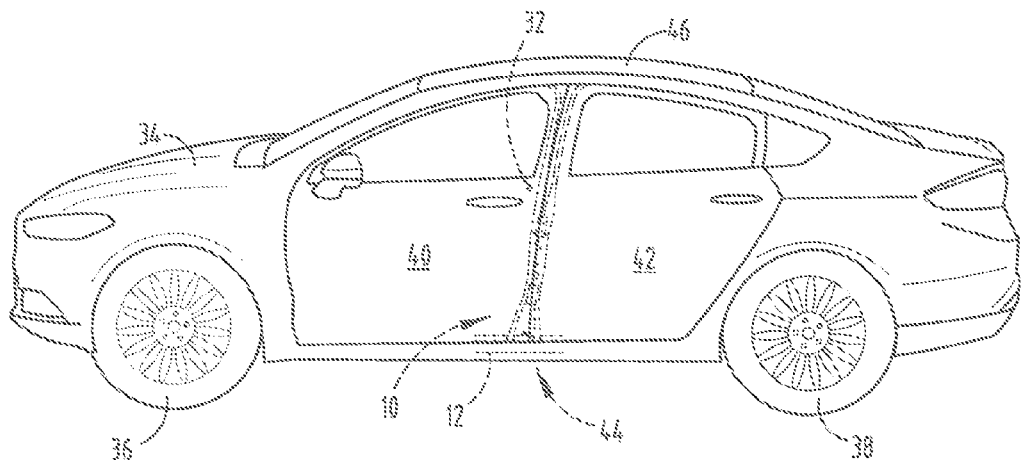
FIG. 1
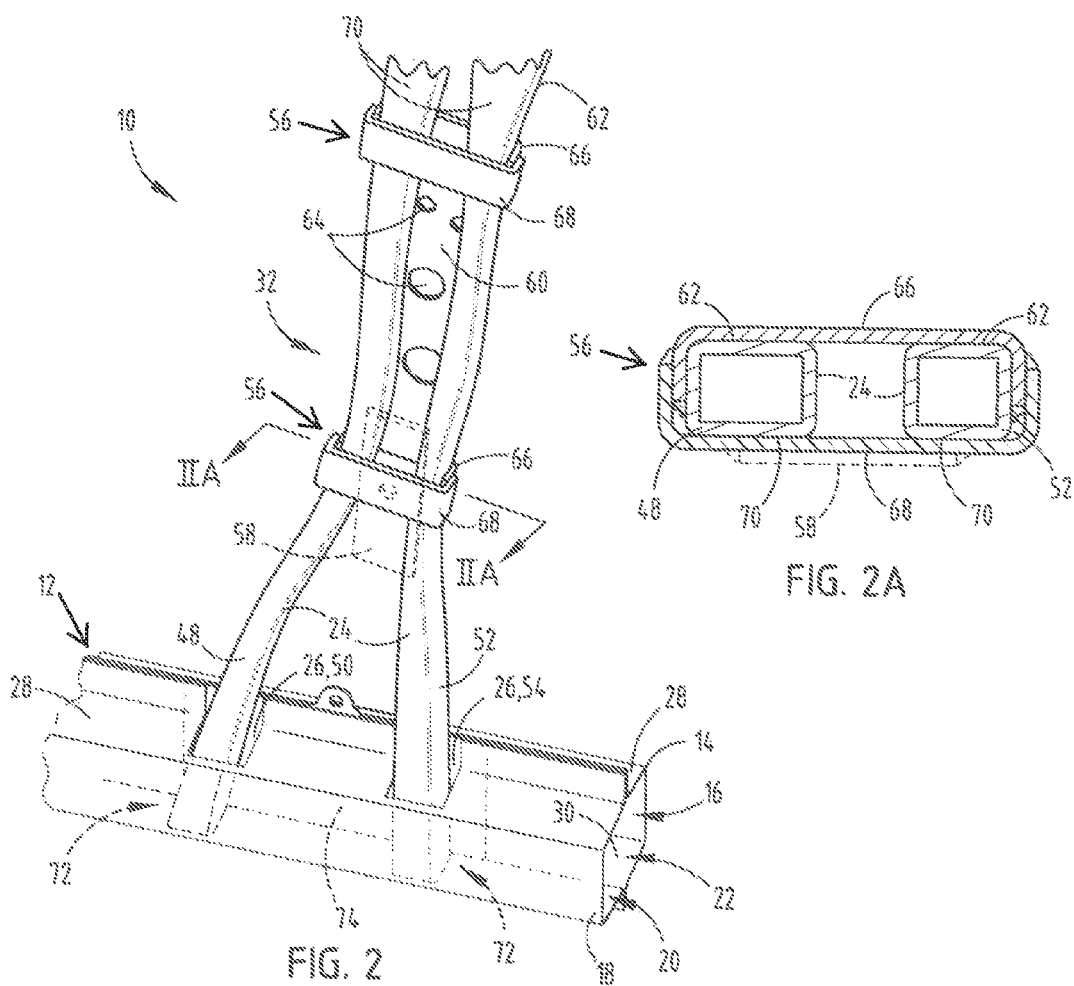
FIG. 2
FIG. 2A

VEHICLE FRAME RAIL AND PILLAR CONNECTION

FIELD OF THE INVENTION

The present invention generally relates to a vehicle frame having a vertical pillar connected with a frame rail, and more particularly relates to a pair of vertical pillar members that extend through an upper portion of the frame rail.

BACKGROUND OF THE INVENTION

It is common for vehicle structural frames to include rails that extend longitudinally between front and rear wheels of the vehicle. In some instances, these rails connect with lateral cross members to support the vehicle floor and provide a connection point for various vertical pillars. As vehicle frames are designed to be lighter to improve vehicle fuel efficiency, collision safety standards are increasing to require the vehicle frame to absorb stronger and more focused impacts. Accordingly, connection joints between frame members, including rails, cross members, and pillars, are becoming increasingly critical to configure or reinforce to maintain structural integrity of the frame without adding unnecessary weight to the vehicle.

SUMMARY OF THE INVENTION

According to one aspect of the present invention, a vehicle frame includes an inside rail having an outward cavity and an outside rail coupled with the inside rail. The outside rail has an inward cavity that aligns with the outward cavity to enclose an interior volume. A pair of vertical members extend through apertures at spaced locations in an upper portion of the outside rail and engage a bottom surface of the inward cavity to define a pillar.

According to another aspect of the present invention, a vehicle frame includes a rail having an interior cavity longitudinally extending within the rail. A plate vertically divides the interior cavity. A pillar extends through an upper portion of the rail. The pillar includes a first vertical member abutting a bottom surface of the interior cavity and a second vertical member longitudinally spaced from the first vertical member and abutting the bottom surface. The first and second vertical members are coupled with the plate.

According to yet another aspect of the present invention, a vehicle frame includes an outside rail section having an upper flange, a lower flange, and an inward facing cavity between the upper and lower flanges. An inside rail section is coupled along the upper and lower flanges of the outside rail section and has an outward facing cavity that aligns with the inward facing cavity to enclose an interior volume. A pair of hydroform tubes extending vertically through apertures at spaced longitudinal locations in the upper flange and engage a bottom surface of the inward cavity to define a pillar for supporting a vehicle roof.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a side elevational view of a vehicle having a vertical pillar attached to an intermediate portion of a rocker rail, according to one embodiment of the present invention;

FIG. 2 is a top perspective view of a lower section of the pillar connected with the intermediate portion of the rocker rail;

FIG. 2A is a cross-sectional view of the pillar taken at line IIA-IIA of FIG. 2;

DETAILED DESCRIPTION OF THE PREFERRED EMBODIMENTS

Figure 3:
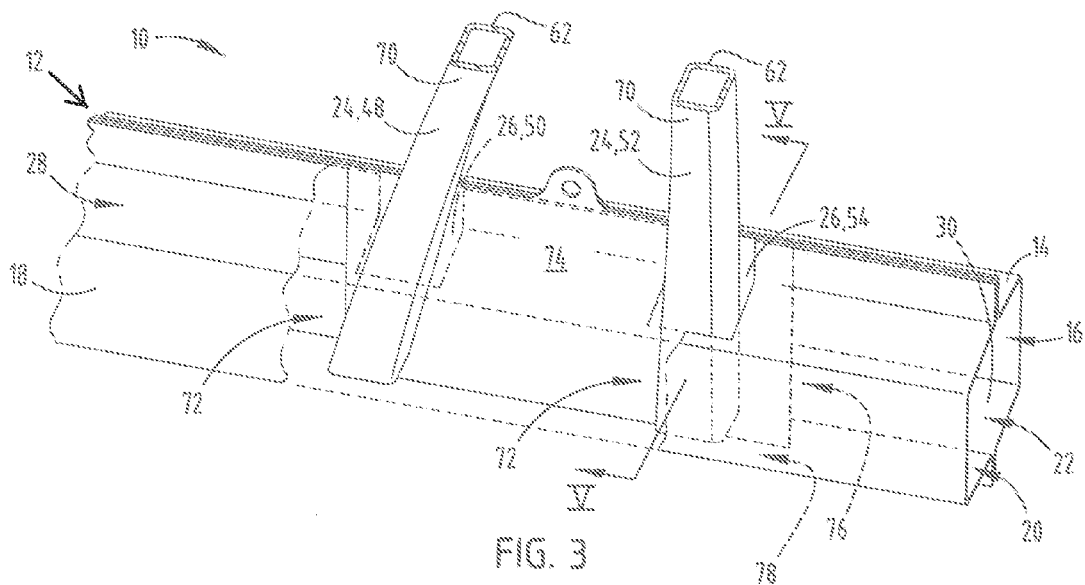
FIG. 3 is a top perspective view of the rocker rail showing portions cut away to illustrate the pillar attached within an interior volume of the rocker rail.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-6A, reference numeral 10 generally designates a vehicle frame that includes a longitudinal rocker rail 12. The rocker rail 12 has an inside rail section 14 with an outward facing cavity 16 and an outside rail section 18 that is coupled with the inside rail section 14. The outside rail section 18 has an inward facing cavity 20 that aligns with the outward facing cavity 16 to enclose an interior volume 22. A pair of vertical members 24 extends through apertures 26 at spaced locations in an upper portion 28 of the outside rail section 18 and engages a bottom surface 30 of the inward facing cavity 20 to define a pillar 32.

As shown in FIG. 1, a vehicle 34 is illustrated with one embodiment of the vehicle frame 10 of the present invention. The vehicle 34 includes a front set of wheels 36 and a rear set of wheels 38 that suspend the vehicle frame 10 from a driving surface. The rocker rail 12 of the frame 10 extends longitudinally between the front and rear sets of wheels 36, 38 beneath a front door 40 and a rear door 42, in the illustrated embodiment. The pillar 32 extends upward from an intermediate portion 44 of the rocker rail 12 between the front door 40 and the rear door 42. Accordingly, the pillar 32 in the illustrated embodiment is commonly referred to as a B-pillar; however, the pillar 32 may conceivably include other pillar structures of the vehicle 34, such as an A-pillar, a C-pillar, or other upstanding pillars. As shown, the pillar 32 extends upward from the longitudinal rail 12 and couples with a roof 46 of the vehicle 34 between the front and rear doors 40, 42. The vehicle 34 may conceivably include other door arrangements and vehicle types, such as a two-door passenger vehicle, a van, a bus, a truck, or other conceivable vehicle types. Further, it is understood that the illustrated vehicle 34 and the described features are with reference to a single side of the vehicle 34 and that the vehicle 34 includes a symmetrical and mirror-imaged opposing side having similar features, such as a corresponding pillar and a corresponding longitudinal rocker rail. However, it is conceivable that the vehicle 34 may include such a pillar 32 on a single side or an alternative location on the vehicle 34.

Referring now to FIG. 2, the pillar 32 is shown having a pair of vertical members 24 extending vertically through the apertures 26 in the upper portion 28 of the outside rail section 18. More specifically, the illustrated vertical members 24 are tubular shaped with a hollow interior volume and are constructed using a hydroform process to shape a light weight metal, such as aluminum. Although, it is contemplated that the vertical members 24 may be formed using alternative processes of construction, such as roll forming, and may employ various materials, including any ferrous metals or other non-ferrous metals. A first vertical member 48 of the pillar 32 extends upward through a first aperture 50 in the upper portion 28 of the outside rail section 18 and slants rearward into closer proximity with a second vertical member 52 of the pillar 32. The second vertical member 50, similarly, extends through a second aperture 54 in an upper portion 28 of the outside rail section 18 that is spaced rearward from the first aperture 50 and the first vertical member 48. The second vertical member 52 extends substantially orthogonal to the rocker rail 12 in an upward vertical direction.

As also illustrated in FIG. 2, above the rocker rail 12, a pair of reinforcement elements 56 is coupled between the first and second vertical members 48, 52 to adjoin the vertical members 24 and bolster the pillar 32. The reinforcement elements 56 are provided to prevent torsional twisting to the pillar 32 and to prevent the first and second vertical members 48, 52 from splaying apart when the pillar 32 receives forces from supporting the vehicle roof 46 or the rear door 42 of the vehicle 34 or from other forces, such as impact forces. Accordingly, a door hinge 58 of the rear door 42 is coupled with the pillar 32 proximate the reinforcement element 56 for pivotally coupling with and supporting the rear vehicle door 42. A connection plate 60 is coupled between inboard surfaces 62 of the first and second vertical members 24. The connection plate 60 includes a series of holes 64 for attaching interior trim components and other interior items to the pillar 32. It is conceivable that the series of holes 64 may be alternatively dispersed on the connection plate 60 and that the connection plate 60 may include different shapes or additional connection plates to accommodate the various interior items. It is also contemplated that the pillar 32 may include additional or fewer reinforcement elements 56 and other sheet metal or sheeting material to enclose and further define the pillar 32.

As further illustrated in FIG. 2A, the reinforcement element 56 includes an interior piece 66 coupled between interior surfaces 62 of the vertical members 24 and an exterior piece 68 coupled between outboard surfaces 70 of the vertical members 24. The interior and exterior pieces 66, 68 of the reinforcement elements 56 overlap on the forward and rearward surfaces of the vertical members 24, such that the reinforcement element 56 surrounds the pair of vertical members 24 to prevent them from splaying apart or otherwise separating further from each other.

As shown in FIG. 3, end portions 72 of the vertical members 24 are shown extending within the interior volume 22 of the rocker rail 12. In the illustrated embodiment, a plate 74 vertically divides the interior volume 22 of the rocker rail 12 into an inboard chamber 76 proximate the outward facing cavity 16 and an outboard chamber 78 proximate the inward facing cavity 20. More specifically, the plate 74 couples between the inside and outside rail sections 14, 18 and vertically divides the interior volume 22 therebetween. The inboard and outboard chambers 76, 78 have open ends to define a generally tubular shape. The first and second vertical members 48, 52 extend into the outboard chamber 78 adjacent to an outer surface 80 of the plate 74. However, it is conceivable that the first or second vertical members 48, 52 may additionally or alternatively extend within the inboard chamber 76.

Figure 4:
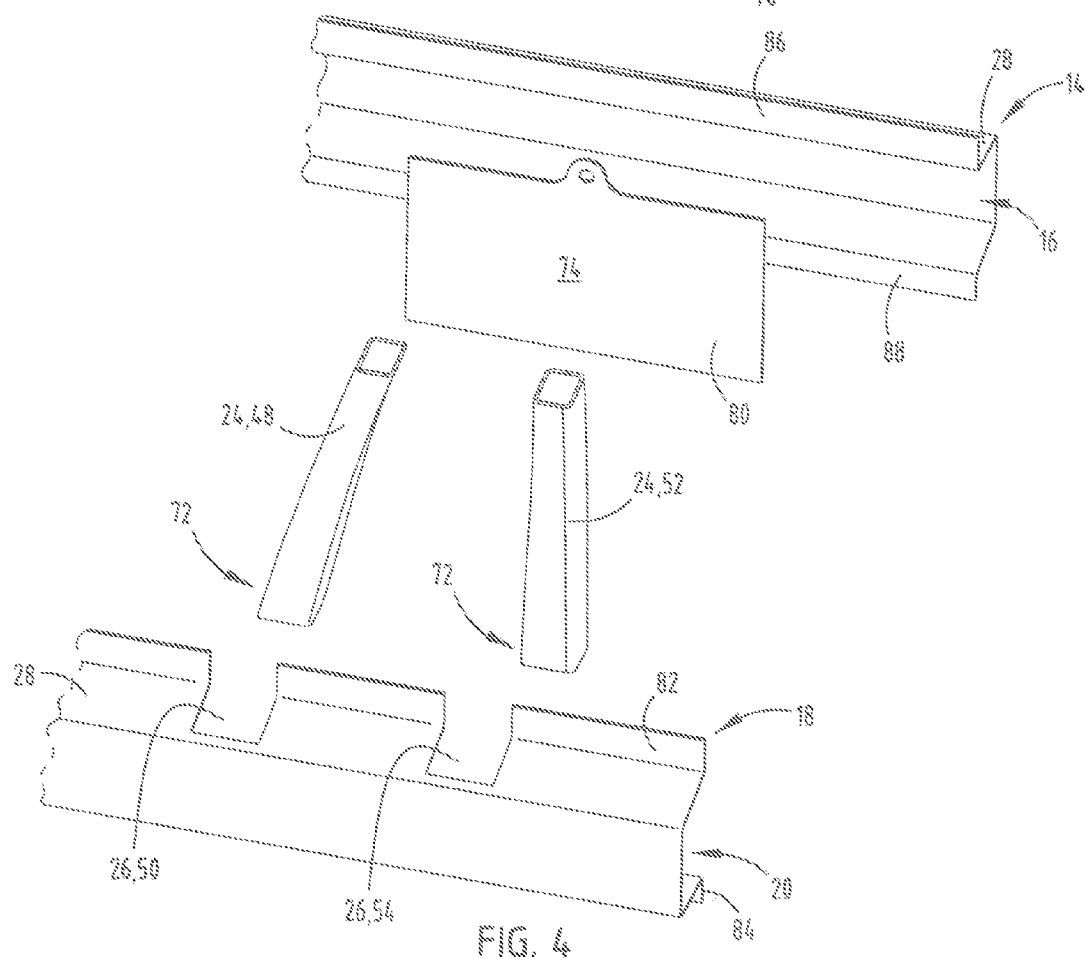
FIG. 4 is an exploded top perspective view of the rocker rail, the pillar, and a plate.

With reference to FIG. 4, the outside rail section 18 has an inward C-shaped cross-section, whereby the outside rail section 18 has an upper flange 82, a lower flange 84, and the inward facing cavity 20 separates the upper and lower flanges 82, 84. The apertures 26 formed in the upper portion 28 of the outside rail section 18 are rectangular shaped and are cut from the upper flange 82 of the outside rail section 18 and a portion of the inward facing cavity 20 to form a rectangular shaped opening. The apertures 26 may conceivably include alternative shapes such as circular, ovular, triangular cutout shapes that may be cut, stamped, or otherwise formed in the outside rail section 18. Further, it is contemplated that the apertures 26 may be partially or completely formed in the upper portion 28 of the inside rail section 14.

As also illustrated in FIG. 4, the inside rail section 14 also includes an upper flange 86, a lower flange 88, and an outward facing cavity 16 separating the upper and lower flanges 86, 88. The inside rail section 14 of the illustrated embodiment also has a similar C-shaped cross-section that aligns with the outside rail section 18, such that the upper and lower flanges 86, 88 of the inside rail section 14 couple with the upper and lower flanges 82, 84 of the outside rail section 18, respectively, along the longitudinal length of the rocker rail 12. The inside and outside rail sections 14, 18 are attached by welding continuously, or conceivably at various points, along the length of upper flanges 82, 86 and lower flanges 84, 88 to form the longitudinal rocker rail 12. Similarly, the plate 74 coupled between the inside and outside rail sections 14, 18 is welded in place therebetween. Conceivably, the attachment of the rail sections 14, 18 and the plate 74 may also be done with an alternative fastening means. The plate 74 has a generally rectangular shape with a solid piece of material that includes a minimal thickness to attach between the rail sections 14, 18 without creating a substantial gap between the upper flanges 82, 86 and the lower flanges 84, 88 forward and rearward the plate 74. However, it is conceivable that the plate 74 may extend the longitudinal length of the rocker rail 12. The plate 74 also provides an attachment surface 80 for the vertical members 24 and provides additional vertical reinforcement to the longitudinal rocker rail 12.

Figure 5:
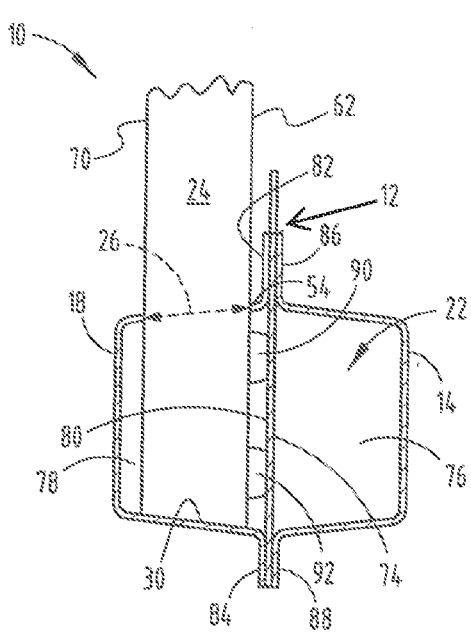
FIG. 5 is a cross-sectional view of the rocker rail, the pillar, and the plate taken at line V-V of FIG. 3.

As shown in FIG. 5, the vertical members 24 physically engage in abutting contact with the bottom surface 30 of the inward facing cavity 20 within the outside rail section 18. Each end portion 72 of the vertical members 24 is welded within the inward facing cavity 20, such that an outer surface 80 of the plate 74 is welded to the vertical members 24 at a top weld 90 and a bottom weld 92 on the plate 74. The vertical members 24 may also be welded in several alternative locations and arrangements within the inward facing cavity 20, as explained in more detail below. To form the top and bottom welds 90, 92, the welds are preferably made before the inside and outside rail sections 14, 18 are engaged, allowing for a welding implement to access the interior volume 22 of the longitudinal rocker rail 12. Accordingly, the first and second apertures 50, 54 in the outside rail section 18 are formed to allow the outside rail section 18 to be assembled to the inside rail section 14 after the vertical members 24 are attached at the top and bottom welds 90, 92 to the plate 74. Again, it is conceivable that the welding may done in an alternative fashion, such as though access holes in the rail sections 14, 18 that allow the vertical members 24 to be welded to the plate after the inside and outside rail sections 14, 18 are attached to each other.

Figure 5A:
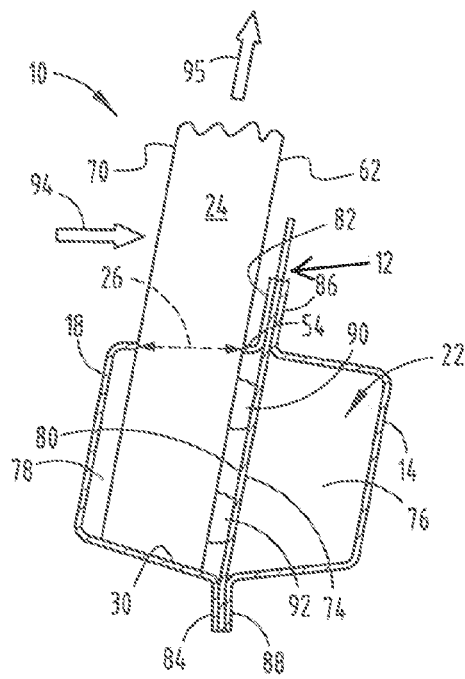
FIG. 5A is a cross-sectional view of the rocker rail and the pillar having a horizontal force and a downward vertical force applied to the pillar.

The embodiment illustrated in FIG. 5A is configured to withstand a horizontal force 94 to an upper portion of the pillar 32, such that the resultant torsional force proximate the end portion 72 of the vertical members 24 is contained within the interior volume 22 of the longitudinal rocker rail 12. As such, the rocker rail 12 is caused to slightly deform inward while maintaining the welded connection between the pair of vertical members 24 and the longitudinal rocker rail 12. The horizontal force 94 may conceivably include side impact forces from other vehicles or objects. As further illustrated, tension forces 95 on the vertical members 24 created by the horizontal forces 94 are contained within the apertures 26 in the outside rail section 18 and are thereby directed to the bottom surface 30 of the inward facing cavity 20. Directing the tension forces 95 to the bottom surface 30 of the inward facing cavity 20 generally prevents the upper flanges 82, 86 of both the inside and outside rail sections 14, 18 from deforming upward and expanding the interior volume 22 of the rocker rail 12.

Figure 6:
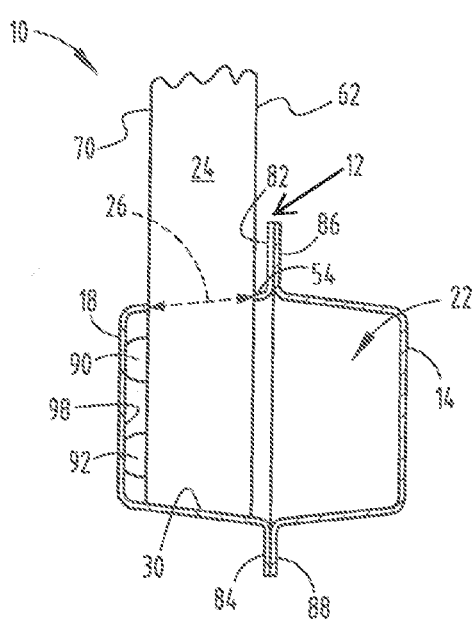
FIG. 6 is a cross-sectional view of an additional embodiment of the a rocker rail and a pillar of the present invention.
Figure 6A:
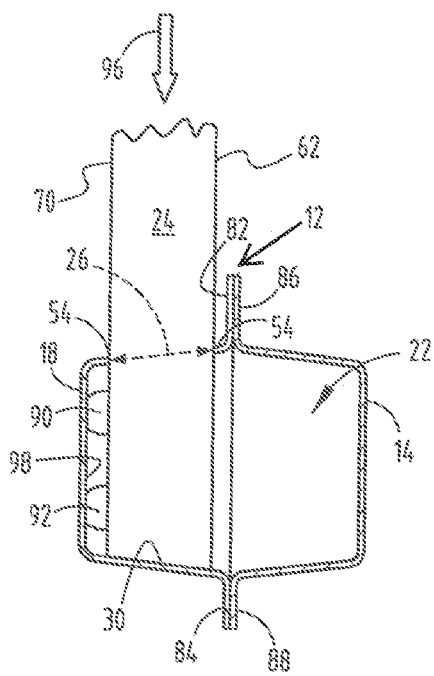
FIG. 6A is a cross-sectional view of the additional embodiment of the rocker rail and the pillar showing a downward vertical force applied to the pillar.

An additional embodiment of the longitudinal rocker rail 12 is shown in FIGS. 6-6A, showing the vertical members 24 extending into the interior volume 22 of the rocker rail 12 absent a plate 74 or any other item vertically dividing the interior volume 22 of the rocker rail 12. In this embodiment, the vertical members 24 are welded to a sidewall surface 98 of the inward facing cavity 20, wherein a top weld 90 and a bottom weld 92 secure the vertical members 24 to the outside rail section 18. Also, the additional embodiment includes the vertical members 24 abutting the bottom surface 30 of the inward facing cavity 20 to provide similar advantages for horizontal forces and tension forces, as shown and described in FIG. 5A. The embodiment shown in FIG. 5A as well as the embodiment shown in FIG. 6A allows a downward loading force 96 to be directed to the bottom surface 30 of the inward facing cavity 20, to thereby generally prevent the upper flanges 82, 86 of both the inside and outside rail sections 14, 18 from deforming and compressing downward into the interior volume 22 of the rocker rail 12. Further in the additional embodiment shown in FIGS. 6-6A, the vertical members 24 may be welded to the outside rail section 18 before the inside rail section 14 is attached to the outside rail section 18. However, it is contemplated that various alternative steps of forming the illustrated connection between the pillar 32 and longitudinal rocker rail 12 may be employed without departing from the present invention.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle frame, comprising:
   an inside rail having an outward cavity;
   an outside rail coupled with the inside rail and having an inward cavity that aligns with the outward cavity to enclose an interior volume;
   a pair of vertical members extending through apertures at spaced locations in an upper portion of the outside rail and engaging a bottom surface of the inward cavity to define a pillar;
   upper and lower reinforcement elements positioned above the inside and outside rails and that encircle the pillar and engage at least inboard and outboard surfaces of each vertical member of the pair of vertical members; and
   a connection plate coupled to the inboard surfaces of the pair or vertical members, wherein the connection plate extends from the upper reinforcement element to the lower reinforcement element.

2. The vehicle frame of claim 1, further comprising:
   a plate coupled between the inside and outside rails, wherein the pair of vertical members couple with the plate within the interior volume.

3. The vehicle frame of claim 1, wherein the pair of vertical members are welded to a sidewall surface of the inward cavity.

4. The vehicle frame of claim 1, wherein the inside and outside rails couple to define a longitudinal rocker, and wherein the pillar extends upward from an intermediate portion of the longitudinal rocker to support a vehicle roof.

5. The vehicle frame of claim 4, wherein the longitudinal rocker includes a forward end proximate a front vehicle wheel and a rearward end proximate a rear vehicle wheel, and wherein the intermediate portion of the longitudinal rocker is located between the forward and rearward ends.

6. The vehicle frame of claim 1, wherein the inside rail and the outside rail each include an upper flange and a lower flange, wherein the upper and lower flanges of the inside rail couple respectively with the upper and lower flanges of the outside rail to enclose the interior volume.

7. The vehicle frame of claim 1, wherein each of the first and second reinforcement elements includes an interior piece that extends between the inboard surfaces of each of the vertical members of the pair of vertical members, and wherein each of the first and second reinforcement elements includes an exterior piece that extends between the outboard surfaces of each of the vertical members of the pair of vertical members.

8. The vehicle frame of claim 7, wherein the pillar couples with a door hinge proximate at least one of the upper and lower reinforcement elements for pivotally supporting a vehicle door.

9. A vehicle frame, comprising:
   a rail having an interior cavity longitudinally extending within the rail;
   a plate vertically dividing the interior cavity; and
   a pillar extending through an upper portion of the rail and comprising:
      a first vertical member abutting a bottom surface of the interior cavity; and
      a second vertical member longitudinally spaced from the first vertical member and abutting the bottom surface, wherein the first and second vertical members couple with the plate; and
      a connecting plate positioned above the rail and extending between the first and second vertical members and attached to inboard surfaces of each of the first and second vertical members, wherein the connecting plate includes at least one opening extending therethrough, wherein at least one interior trim component is attached to the pillar via the at least one opening of the connecting plate.

10. The vehicle frame of claim 9, wherein the plate divides the interior cavity into an inboard chamber and an outboard chamber proximate an intermediate portion of the rail.

11. The vehicle frame of claim 10, wherein end portions of the first and second vertical members are engaged within the outboard chamber of the interior cavity.

12. The vehicle frame of claim 9, wherein the first and second vertical members are each coupled with the plate within the interior cavity at a top weld and a bottom weld.

13. The vehicle frame of claim 9, wherein the rail includes an inside rail section with an outward C-shaped cross section and an outside rail section with an inward C-shaped cross section, and wherein the inside and outside rail sections couple with opposing sides of the plate to define an inboard chamber and an outboard chamber.

14. The vehicle frame of claim 13, wherein end portions of the first and second vertical members are welded within the outboard chamber of the interior cavity.

15. The vehicle frame of claim 9, further comprising:
   a reinforcement element coupled between the first and second vertical members at a location above the rail for preventing torsion of the pillar.

16. The vehicle frame of claim 15, wherein the reinforcement element includes an interior piece coupled between inboard surfaces of the vertical members and an exterior piece coupled between outboard surfaces of the vertical members.

17. A vehicle frame, comprising:
   an outside rail section having an upper flange, a lower flange, and an inward facing cavity between the upper and lower flanges;
   an inside rail section coupled along the upper and lower flanges of the outside rail section and having an outward facing cavity that aligns with the inward facing cavity to enclose an interior volume;
   a pair of hydroform tubes extending vertically through apertures at spaced longitudinal locations in the upper flange and engaging a bottom surface of the inward cavity to define a pillar for supporting a vehicle roof;
   first and second reinforcement elements positioned above the outside and inside rail sections, each of the first and second reinforcement elements extending around the pair of hydroform tubes and engaging both inboard and outboard surface of each of the hydroform tubes of the pair of hydroform tubes; and
   a connection plate attached to the inboard surfaces of each hydroform tube of the pair of hydroform tubes, wherein the connection plate includes a plurality of holes defined therein, wherein the plurality of holes are configured to receive and secure at least one interior trim component proximate the pair of hydroform tubes.

18. The vehicle frame of claim 17, further comprising:
   a plate coupled between the inside and outside rail sections, wherein the pair of hydroform tubes are coupled with the plate within the inward facing cavity at a top weld and a bottom weld on the plate.

19. The vehicle frame of claim 17, wherein the inside and outside rail sections define a longitudinal rocker rail, and wherein the pillar extends upward from an intermediate portion of the longitudinal rocker rail to support a vehicle door.

20. The vehicle frame of claim 17, wherein each of the first and second reinforcement elements includes an interior piece that extends between the inboard surfaces of each of the hydroform tubes of the pair of hydroform tubes, and wherein each of the first and second reinforcement elements includes an exterior piece that extends between the outboard surfaces of each of the hydroform tubes of the pair of hydroform tubes, and wherein the exterior piece at least partially overlaps the interior piece.

* * * * *